(12) United States Patent
Leys et al.

(10) Patent No.: US 11,006,578 B2
(45) Date of Patent: *May 18, 2021

(54) DRAPER SEAL FOR CROP HEADER

(71) Applicant: HONEY BEE MANUFACTURING LTD., Frontier (CA)

(72) Inventors: Darren Leys, Frontier (CA); Barry Lindmark, Frontier (CA)

(73) Assignee: HONEY BEE MANUFACTURING LTD., Frontier (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,971

(22) Filed: May 26, 2020

(65) Prior Publication Data

US 2020/0281123 A1    Sep. 10, 2020

Related U.S. Application Data

(63) Continuation of application No. 16/410,174, filed on May 13, 2019, now Pat. No. 10,694,675, which is a
(Continued)

(30) Foreign Application Priority Data

Dec. 18, 2012  (CA) .................................. CA 2799093

(51) Int. Cl.
*A01D 61/02*    (2006.01)
*A01D 41/14*    (2006.01)
(Continued)

(52) U.S. Cl.
CPC ............. *A01D 61/02* (2013.01); *A01D 34/04* (2013.01); *A01D 34/14* (2013.01); *A01D 34/40* (2013.01);
(Continued)

(58) Field of Classification Search
CPC ........ A01D 61/02; A01D 41/14; A01D 34/04; A01D 34/40; A01D 61/002; A01D 34/14; A01D 2101/00; A01D 57/20
See application file for complete search history.

(56) References Cited

U.S. PATENT DOCUMENTS 12,750 A    4/1855   Chatfield
524,215 A   8/1894   Quigley
(Continued)

FOREIGN PATENT DOCUMENTS

CA    1003310    1/1977
CA    1040438    10/1978
(Continued)

OTHER PUBLICATIONS

Notification issued by the Canadian Intellectual Property Office dated Dec. 23, 2016 regarding a Protest filed on Dec. 14, 2016 against corresponding Canadian Patent Application No. 2,803,762, 15 pages.

*Primary Examiner* — Arpad Fabian-Kovacs

(57) ABSTRACT

A header includes a forwardly disposed cutter bar assembly and a rearwardly disposed draper deck assembly. The draper seal includes a flexible strip that runs parallel to the cutter bar assembly and perpendicular to the direction of travel. A bracket secures the forward edge of the flexible strip to an upper surface of the cutter bar assembly, which bracket also biases a rearward edge of the flexible strip into engagement with an upper surface of the draper deck assembly, thereby creating a seal between the cutter bar assembly and the draper deck assembly.

8 Claims, 2 Drawing Sheets

Related U.S. Application Data continuation of application No. 15/453,161, filed on Mar. 8, 2017, now Pat. No. 10,285,331, which is a continuation of application No. 13/766,800, filed on Feb. 14, 2013, now Pat. No. 9,635,810.

(51) Int. Cl.
*A01D 34/04* (2006.01)
*A01D 34/14* (2006.01)
*A01D 34/40* (2006.01)
*A01D 61/00* (2006.01)
*A01D 101/00* (2006.01)

(52) U.S. Cl.
CPC ........... *A01D 41/14* (2013.01); *A01D 61/002* (2013.01); *A01D 2101/00* (2013.01)

(56) References Cited

U.S. PATENT DOCUMENTS

| | | |
|---|---|---|
| 855,519 A | 6/1907 | Maloney |
| 1,422,002 A | 7/1922 | Shaw |
| 1,862,101 A * | 6/1932 | Pax ...................... A01D 61/002 198/523 |
| 1,917,604 A * | 7/1933 | Scranton, Jr. .......... A01D 34/13 56/298 |
| 2,235,602 A * | 3/1941 | Biesemeyer ......... A01D 61/002 56/181 |
| 2,237,517 A | 4/1941 | Anderson |
| 2,347,365 A * | 4/1944 | Paradise Louisa .... A01D 57/20 198/699 |
| 2,413,072 A | 12/1946 | Sage |
| 2,599,438 A | 6/1952 | Downing et al. |
| 2,681,134 A | 6/1954 | White, Jr. |
| 2,685,958 A * | 8/1954 | White, Jr. ................. E02F 7/00 198/836.1 |
| 2,687,209 A | 8/1954 | Rost et al. |
| 2,694,894 A | 11/1954 | Linscheld |
| 2,720,743 A * | 10/1955 | Prather ................ A01D 61/008 56/207 |
| 2,795,922 A * | 6/1957 | Hume .................... A01D 41/14 56/257 |
| 3,169,633 A | 2/1965 | Baker |
| 3,344,909 A * | 10/1967 | Hansen ................ F26B 25/008 198/836.1 |
| 3,468,109 A | 9/1969 | Reimer |
| 3,472,008 A | 10/1969 | Hurlburt |
| 3,550,366 A | 12/1970 | Gibson |
| 3,771,299 A | 11/1973 | Gradwohl et al. |
| 3,866,400 A * | 2/1975 | May ...................... A01D 57/26 56/158 |
| 3,927,512 A | 12/1975 | Molzahn |
| 3,945,180 A | 3/1976 | Sinclair |
| 4,038,810 A | 8/1977 | Williams et al. |
| 4,067,177 A | 1/1978 | Tout |
| 4,120,137 A | 10/1978 | Schoenberger et al. |
| 4,127,981 A | 12/1978 | Parrish et al. |
| 4,137,696 A | 2/1979 | Webb |
| 4,156,340 A | 5/1979 | Colgan et al. |
| 4,174,602 A | 11/1979 | Webb et al. |
| 4,177,625 A | 12/1979 | Knight et al. |
| 4,187,664 A | 2/1980 | Meek et al. |
| 4,198,803 A * | 4/1980 | Quick .................... A01D 34/13 56/296 |
| 4,199,925 A * | 4/1980 | Quick .................... A01D 41/14 56/208 |
| 4,202,154 A | 5/1980 | Waldrop et al. |
| 4,270,338 A | 6/1981 | Halls |
| 4,346,909 A | 8/1982 | Hundeby |
| 4,353,201 A | 10/1982 | Pierce et al. |
| 4,435,948 A | 3/1984 | Jennings |
| 4,441,307 A * | 4/1984 | Enzmann ............... A01D 41/14 56/10.2 R |
| 4,512,140 A | 4/1985 | Blakeslee |
| 4,519,190 A | 5/1985 | Blakeslee |
| 4,522,018 A | 6/1985 | Blakeslee |
| 4,541,229 A | 9/1985 | Elijah |
| 4,573,124 A | 2/1986 | Seiferling |
| 4,573,309 A | 3/1986 | Patterson |
| 4,612,757 A | 9/1986 | Halls et al. |
| 4,637,201 A | 1/1987 | Pruitt et al. |
| 4,641,490 A | 2/1987 | Wynn et al. |
| 4,660,361 A | 4/1987 | Remillard et al. |
| 4,662,161 A | 5/1987 | Patterson |
| 4,722,172 A * | 2/1988 | Pearce .................. A01D 34/13 56/14.4 |
| 4,751,809 A | 6/1988 | Fox et al. |
| 4,776,155 A | 10/1988 | Fox et al. |
| 4,833,869 A | 5/1989 | Klein |
| 4,909,026 A | 3/1990 | Molzahn et al. |
| 4,936,082 A | 6/1990 | Majkrzak |
| 4,944,141 A | 7/1990 | Orlando et al. |
| 4,956,966 A | 9/1990 | Patterson |
| 5,005,343 A | 4/1991 | Patterson |
| 5,007,235 A | 4/1991 | Nickel et al. |
| 5,086,613 A | 2/1992 | Fox et al. |
| 5,155,983 A | 10/1992 | Sheehan et al. |
| 5,157,905 A | 10/1992 | Talbot et al. |
| 5,219,064 A * | 6/1993 | Roman .................... B03B 9/06 198/823 |
| 5,243,810 A | 9/1993 | Fox et al. |
| 5,261,290 A | 11/1993 | Ramsay et al. |
| 5,359,839 A | 11/1994 | Parsons et al. |
| 5,435,239 A | 7/1995 | Talbot |
| 5,459,986 A * | 10/1995 | Talbot .................. A01D 61/002 56/181 |
| 5,473,872 A | 12/1995 | Fox et al. |
| 5,535,577 A | 7/1996 | Chmielewski et al. |
| 5,595,053 A | 1/1997 | Jasper et al. |
| RE35,543 E | 7/1997 | Patterson |
| 5,678,398 A | 10/1997 | Fox et al. |
| 5,681,117 A | 10/1997 | Wellman et al. |
| 5,704,200 A | 1/1998 | Chmielewski, Jr. et al. |
| 5,768,870 A | 6/1998 | Talbot et al. |
| 5,791,128 A | 8/1998 | Rogalsky |
| 5,927,606 A | 7/1999 | Patterson |
| 5,992,759 A | 11/1999 | Patterson |
| 6,029,429 A | 2/2000 | Fox et al. |
| 6,044,636 A | 4/2000 | Minnaert |
| 6,079,194 A | 6/2000 | Waldrop |
| 6,170,244 B1 | 1/2001 | Coers et al. |
| 6,195,972 B1 | 3/2001 | Talbot et al. |
| 6,199,358 B1 | 3/2001 | Majkrzak |
| 6,282,876 B1 | 9/2001 | Patterson |
| 6,324,823 B1 | 12/2001 | Remillard |
| 6,351,931 B1 * | 3/2002 | Shearer .................. A01D 57/20 56/14.5 |
| 6,397,573 B2 | 6/2002 | Majkrzak |
| 6,442,918 B1 | 9/2002 | Fox |
| 6,453,655 B2 | 9/2002 | Ferraris |
| 6,502,379 B1 | 1/2003 | Snider |
| 6,519,923 B1 | 2/2003 | Cooksey et al. |
| 6,530,202 B1 | 3/2003 | Guyer |
| 6,543,211 B1 | 4/2003 | Talbot |
| 6,591,598 B2 | 7/2003 | Remillard et al. |
| 6,675,568 B2 | 1/2004 | Patterson et al. |
| 6,698,175 B1 | 3/2004 | Schumacher et al. |
| 6,708,475 B2 | 3/2004 | Guyer |
| 6,817,166 B2 | 11/2004 | Dunn |
| 6,843,045 B2 | 1/2005 | Bickel |
| 6,854,251 B2 | 2/2005 | Snider |
| 6,865,871 B2 | 3/2005 | Patterson et al. |
| 6,889,492 B1 | 5/2005 | Polk et al. |
| 6,962,040 B2 | 11/2005 | Talbot |
| 7,077,220 B2 | 7/2006 | Dunn et al. |
| 7,131,253 B2 | 11/2006 | Remillard et al. |
| 7,159,687 B2 | 1/2007 | Dunn et al. |
| 7,188,461 B2 | 3/2007 | Fox et al. |
| 7,197,865 B1 | 4/2007 | Enns et al. |
| 7,306,062 B2 | 12/2007 | Dunn |
| 7,306,252 B2 | 12/2007 | Barnett |
| 7,308,947 B2 | 12/2007 | Barnett |
| 7,322,175 B2 | 1/2008 | Ferre et al. |

(56) References Cited

U.S. PATENT DOCUMENTS

| | | | |
|---|---|---|---|
| 7,328,565 B2 | 2/2008 | Snider et al. | |
| 7,340,876 B1 | 3/2008 | Barnett | |
| 7,347,277 B2 | 3/2008 | Enns et al. | |
| 7,356,982 B2 | 4/2008 | Barnett | |
| 7,364,181 B2 | 4/2008 | Patterson | |
| 7,373,769 B2 | 5/2008 | Talbot et al. | |
| 7,392,124 B2 | 6/2008 | MacGregor et al. | |
| 7,392,646 B2 | 7/2008 | Patterson | |
| 7,412,816 B2 | 8/2008 | Coers et al. | |
| 7,438,305 B2 | 10/2008 | Schulz | |
| 7,444,798 B2 | 11/2008 | Patterson et al. | |
| 7,454,888 B2 | 11/2008 | Barnett | |
| 7,461,498 B1 | 12/2008 | Barnett | |
| 7,467,505 B2 | 12/2008 | MacGregor | |
| 7,467,506 B2 | 12/2008 | Lovett et al. | |
| 7,472,533 B2 | 1/2009 | Talbot et al. | |
| 7,478,521 B2 | 1/2009 | Coers et al. | |
| 7,484,349 B2 | 2/2009 | Talbot et al. | |
| 7,497,069 B2 | 3/2009 | Enns et al. | |
| 7,549,280 B2 * | 6/2009 | Lovett | A01D 57/20 56/208 |
| 7,591,127 B1 * | 9/2009 | Stacer | A01D 65/00 56/12.9 |
| 7,600,364 B2 | 10/2009 | Lovett et al. | |
| 7,640,720 B1 | 1/2010 | Lovett et al. | |
| 7,647,755 B2 | 1/2010 | Barnett et al. | |
| 7,721,830 B2 | 5/2010 | Dunn et al. | |
| 7,730,707 B2 | 6/2010 | Pietricola et al. | |
| 7,849,952 B2 | 12/2010 | MacGregor et al. | |
| 7,856,801 B2 | 12/2010 | Remillard | |
| 7,886,511 B2 * | 2/2011 | Honas | A01D 57/20 56/181 |
| 7,908,836 B1 | 3/2011 | Rayfield et al. | |
| 7,918,076 B2 | 4/2011 | Talbot | |
| 7,937,920 B2 | 5/2011 | Schmidt et al. | |
| 7,958,706 B2 | 6/2011 | Remillard et al. | |
| 7,958,711 B1 * | 6/2011 | Sauerwein | A01D 57/20 56/181 |
| 7,971,418 B2 * | 7/2011 | Conrad | A01D 41/148 56/181 |
| 7,975,462 B1 * | 7/2011 | Figgins | A01D 41/14 56/181 |
| 8,006,469 B2 | 8/2011 | Barnett | |
| 8,006,831 B1 * | 8/2011 | Mackin | A01D 57/20 198/860.1 |
| 8,015,784 B2 | 9/2011 | Barnett et al. | |
| 8,020,363 B1 | 9/2011 | Barnett et al. | |
| 8,020,648 B2 | 9/2011 | Otto | |
| 8,056,311 B1 | 11/2011 | Barnett | |
| 8,065,865 B1 * | 11/2011 | Dow | A01D 61/002 56/181 |
| 8,069,640 B2 | 12/2011 | Barnett et al. | |
| 8,091,330 B2 | 1/2012 | Lohrentz et al. | |
| 8,096,102 B2 | 1/2012 | Smith | |
| 8,117,812 B2 | 2/2012 | Patterson | |
| 8,161,719 B2 | 4/2012 | Barnett et al. | |
| 8,176,716 B2 | 5/2012 | Coers et al. | |
| 8,191,344 B2 | 6/2012 | Sauerwein | |
| 8,205,421 B2 | 6/2012 | Sauerwein et al. | |
| 8,205,422 B2 | 6/2012 | Sauerwein et al. | |
| 8,225,589 B2 | 7/2012 | Barnett | |
| 8,225,903 B2 | 7/2012 | Dunn | |
| 8,240,114 B2 | 8/2012 | Barnett | |
| 8,245,489 B2 | 8/2012 | Talbot | |
| 8,281,561 B2 | 10/2012 | Dow et al. | |
| 8,286,411 B2 | 10/2012 | Barnett et al. | |
| 8,286,412 B2 | 10/2012 | Kidd et al. | |
| 8,291,684 B2 | 10/2012 | Remillard et al. | |
| 8,291,686 B1 * | 10/2012 | Cormier | A01D 61/002 56/181 |
| 8,307,620 B1 | 11/2012 | Barnett et al. | |
| 8,333,057 B2 | 12/2012 | Schroeder et al. | |
| 8,341,927 B2 | 1/2013 | Barnett | |
| 8,341,929 B2 | 1/2013 | Sauerwein et al. | |
| 8,387,351 B2 | 3/2013 | Guyer | |
| 8,402,728 B2 | 3/2013 | Kidd | |
| 8,408,567 B2 | 4/2013 | Bergman et al. | |
| 8,434,290 B2 | 5/2013 | Barnett et al. | |
| 8,468,789 B2 | 6/2013 | Barnett et al. | |
| 8,484,938 B2 | 7/2013 | Cormier et al. | |
| 8,484,939 B1 * | 7/2013 | Cormier | A01D 43/06 56/181 |
| 8,511,050 B1 * | 8/2013 | Cormier | A01D 57/20 56/181 |
| 8,590,284 B2 | 11/2013 | Rayfield | |
| 9,271,443 B2 * | 3/2016 | Sethi | A01D 41/14 |
| 9,338,941 B2 * | 5/2016 | Herringshaw | A01D 34/40 |
| 9,814,183 B2 * | 11/2017 | Allochis | A01D 41/14 |
| 2002/0129591 A1 * | 9/2002 | Patterson | A01D 57/20 56/158 |
| 2007/0193243 A1 * | 8/2007 | Schmidt | A01D 57/20 56/181 |
| 2007/0204584 A1 * | 9/2007 | Goers | A01D 41/14 56/15.8 |
| 2007/0204589 A1 * | 9/2007 | Goers | A01D 57/20 56/208 |
| 2008/0092508 A1 * | 4/2008 | Talbot | A01D 57/20 56/181 |
| 2008/0271426 A1 * | 11/2008 | Lohrentz | A01D 41/14 56/153 |
| 2008/0276590 A1 * | 11/2008 | Sauerwein | A01D 41/14 56/153 |
| 2008/0276591 A1 | 11/2008 | Tippery et al. | |
| 2009/0007533 A1 * | 1/2009 | Lovett | A01D 61/002 56/14.5 |
| 2009/0266044 A1 * | 10/2009 | Goers | A01D 57/20 56/208 |
| 2009/0277146 A1 * | 11/2009 | Sauerwein | A01D 34/13 56/208 |
| 2009/0288383 A1 * | 11/2009 | Sauerwein | A01D 57/20 56/181 |
| 2009/0308042 A1 * | 12/2009 | Lovett | A01D 57/20 56/153 |
| 2010/0313540 A1 | 12/2010 | Sauerwein | |
| 2011/0308221 A1 * | 12/2011 | Sauerwein | A01D 61/002 56/181 |
| 2012/0042617 A1 * | 2/2012 | Dow | A01D 57/20 56/14.5 |
| 2012/0043185 A1 * | 2/2012 | Dow | A01D 61/002 198/837 |
| 2012/0233974 A1 * | 9/2012 | Cormier | A01D 61/006 56/181 |
| 2012/0251653 A1 | 10/2012 | Mathy, Jr. et al. | |
| 2012/0260870 A1 | 10/2012 | Wahl et al. | |
| 2013/0036860 A1 | 2/2013 | Comiani | |
| 2013/0160417 A1 * | 6/2013 | Huseman | A01D 41/14 56/181 |
| 2014/0001726 A1 | 1/2014 | Statz | |
| 2014/0033940 A1 | 2/2014 | Simpson et al. | |
| 2014/0059995 A1 * | 3/2014 | Cormier | A01D 43/06 56/181 |
| 2014/0150601 A1 | 6/2014 | McGrath | |
| 2014/0196427 A1 * | 7/2014 | Fuechtling | A01D 61/002 56/181 |
| 2016/0316620 A1 * | 11/2016 | Allochis | A01D 34/14 |
| 2020/0015418 A1 * | 1/2020 | Talbot | A01D 34/14 |

FOREIGN PATENT DOCUMENTS

| | | |
|---|---|---|
| CA | 1043577 | 12/1978 |
| CA | 2180627 | 1/1980 |
| CA | 1086508 | 9/1980 |
| CA | 1087402 | 10/1980 |
| CA | 1185438 | 4/1985 |
| CA | 1197694 | 12/1985 |
| CA | 1318135 | 5/1993 |
| CA | 2100204 | 1/1995 |
| CA | 2126909 | 1/1995 |
| CA | 2138939 A1 | 6/1996 |
| CA | 2180625 | 1/1998 |
| CA | 2180626 | 1/1998 |

(56) References Cited

FOREIGN PATENT DOCUMENTS

| | | |
|---|---|---|
| CA | 2211363 | 1/1998 |
| CA | 2198672 | 8/1998 |
| CA | 2226200 | 11/1998 |
| CA | 2229152 | 8/1999 |
| CA | 2245213 | 2/2000 |
| CA | 2280681 | 2/2000 |
| CA | 2184278 | 8/2000 |
| CA | 2289164 | 10/2000 |
| CA | 2289171 | 10/2000 |
| CA | 2284432 | 4/2001 |
| CA | 2284436 | 4/2001 |
| CA | 2320379 | 5/2001 |
| CA | 2311019 A1 | 8/2001 |
| CA | 2307176 | 10/2001 |
| CA | 2320524 | 3/2002 |
| CA | 2357825 | 9/2002 |
| CA | 2380557 | 10/2002 |
| CA | 2387898 | 12/2002 |
| CA | 2358883 | 4/2003 |
| CA | 2359598 | 4/2003 |
| CA | 2370891 | 4/2003 |
| CA | 2399234 | 6/2003 |
| CA | 2389513 | 12/2003 |
| CA | 2406416 | 4/2004 |
| CA | 2406419 | 4/2004 |
| CA | 2427755 | 11/2004 |
| CA | 2461790 | 11/2004 |
| CA | 2467595 | 12/2004 |
| CA | 2434981 | 1/2005 |
| CA | 2510883 | 12/2005 |
| CA | 2513037 | 2/2006 |
| CA | 2341283 | 3/2006 |
| CA | 2494395 | 6/2006 |
| CA | 2494034 | 7/2006 |
| CA | 2505431 | 9/2006 |
| CA | 2505458 | 9/2006 |
| CA | 2531189 | 9/2006 |
| CA | 2513605 | 1/2007 |
| CA | 2513614 | 1/2007 |
| CA | 2528731 | 1/2007 |
| CA | 2743336 | 1/2007 |
| CA | 2521187 | 3/2007 |
| CA | 2522387 | 4/2007 |
| CA | 2524151 | 4/2007 |
| CA | 2525904 | 5/2007 |
| CA | 2527797 | 5/2007 |
| CA | 2534200 | 6/2007 |
| CA | 2538020 | 8/2007 |
| CA | 2554689 | 1/2008 |
| CA | 2596403 | 2/2008 |
| CA | 2559217 | 3/2008 |
| CA | 2559353 | 3/2008 |
| CA | 2561463 | 3/2008 |
| CA | 2609744 | 5/2008 |
| CA | 2627320 | 9/2008 |
| CA | 2626486 | 2/2009 |
| CA | 2639032 | 3/2009 |
| CA | 2783567 | 3/2009 |
| CA | 2587107 | 7/2009 |
| CA | 2627053 | 9/2009 |
| CA | 2722896 A1 | 11/2009 |
| CA | 2578907 | 4/2010 |
| CA | 2671880 | 4/2010 |
| CA | 2564777 C | 8/2010 |
| CA | 2695689 | 9/2010 |
| CA | 2665580 | 11/2010 |
| CA | 2665589 | 11/2010 |
| CA | 2706704 | 1/2011 |
| CA | 2706705 | 1/2011 |
| CA | 2706706 | 1/2011 |
| CA | 2706707 | 1/2011 |
| CA | 2775891 | 1/2011 |
| CA | 2783670 | 1/2011 |
| CA | 2713636 | 2/2011 |
| CA | 2596627 | 4/2011 |
| CA | 2686017 | 5/2011 |
| CA | 2721118 | 5/2011 |
| CA | 2739632 | 11/2011 |
| CA | 2708744 | 12/2011 |
| CA | 2745105 | 12/2011 |
| CA | 2538489 | 1/2012 |
| CA | 2707624 | 1/2012 |
| CA | 2709336 | 1/2012 |
| CA | 2710676 | 2/2012 |
| CA | 2734475 | 5/2012 |
| CA | 2766611 | 7/2012 |
| CA | 2744070 | 12/2012 |
| CA | 2802894 | 1/2013 |
| CA | 2796109 | 5/2013 |
| CA | 2796120 | 5/2013 |
| CA | 2796131 | 5/2013 |
| CA | 2796134 | 5/2013 |
| CA | 2796177 | 5/2013 |
| CA | 2796165 | 6/2013 |
| CA | 2802958 | 7/2013 |
| CA | 2802963 | 7/2013 |
| CA | 2802972 | 7/2013 |
| CA | 2802975 | 7/2013 |
| CA | 2803470 | 7/2013 |
| CA | 2814924 | 10/2013 |
| CA | 2815395 | 10/2013 |
| CA | 2815408 | 10/2013 |
| CA | 2815421 | 10/2013 |
| CA | 2815427 | 10/2013 |
| CA | 2789049 A1 | 12/2013 |
| EP | 1935226 | 6/2008 |
| WO | 2012/166629 | 12/2012 |

* cited by examiner

DRAPER SEAL FOR CROP HEADER

CROSS-REFERENCE TO RELATED APPLICATIONS

This application is a continuation of U.S. patent application Ser. No. 16/410,174 filed on May 13, 2019 (now U.S. Pat. No. 10,694,675 issued on Jun. 30, 2020), which is a Continuation of U.S. patent application Ser. No. 15/453,161 filed on Mar. 8, 2017 (now U.S. Pat. No. 10,285,331 issued on May 14, 2019), which is a continuation of U.S. patent application Ser. No. 13/766,800 filed on Feb. 14, 2013 (now U.S. Pat. No. 9,635,810 issued on May 2, 2017), which claims priority to Canadian Patent Application Serial No. 2,799,093 filed on Dec. 18, 2012. The entire contents of the aforementioned applications are hereby incorporated by reference herein.

FIELD OF THE INVENTION

The invention relates to agricultural implements for harvesting crops, and more particularly to harvesting headers comprising a draper deck.

BACKGROUND OF THE INVENTION

It is known in the field of crop harvesting equipment to employ harvesting headers to cut crops for various purposes, such as feeding a combine harvester or swathing crop material. Such harvesting headers may comprise a cutter bar assembly for cutting the crop material, and a draper deck assembly for transporting the cut crop material to a desired location (e.g. the intake for a combine harvester). The draper deck assembly normally comprises two spaced-apart rollers for receiving a continuous loop of draper fabric or canvas, with a support plate fixed under the upper run of draper canvas and disposed between the rollers. In operation, the implement is driven into the standing crop, with the cutting edge assembly at the leading edge of the implement. After the cutting edge assembly cuts the crop material, the crop material falls and/or is moved rearwardly onto the generally horizontal draper deck assembly and then transported perpendicular to the direction of travel by the draper deck assembly and deposited either on the ground or at an intake for subsequent processing. Such an arrangement has many known benefits and has achieved wide acceptance and use.

However, it has been recognized that traditional cutter/draper arrangements as described above may generate undesirable results. In the traditional arrangement, the cutter bar assembly is slightly spaced from the draper deck assembly, and the gap between the two assemblies can receive chaff, mud, plant juices and other materials that can accumulate on surfaces adjacent the gap and ultimately interfere with optimal operation of the implement.

Some attempts have been made to address this problem by sealing the gap between the cutter bar assembly and the draper deck assembly. In one such attempt, for example, a John Deere Model 800 header was provided with a sealing plate mounted on the cutter bar assembly and extending rearwardly over the forward edge of the draper deck assembly. However, it has been recognized that the draper canvas can become pinched between the sealing plate and the support plate underlying the draper canvas, resulting in wear, and it has been noted that accumulation of undesirable materials was still evident.

In response to this identified deficiency, an alternative solution was proposed in Canadian Patent No. 2,138,939 to MacDon Industries Ltd. In this alternative solution, the support plate and rollers were shifted rearwardly of the leading edge of the draper canvas, resulting in a cantilevered edge of the draper canvas that could be in contact with an overhanging sealing plate without binding against the support plate in operation. However, there is an obvious lack of support for the forward edge of the draper canvas, with the risk that undesirable materials can still foul the moving parts of the implement.

What is needed, therefore, is a solution that provides a reliable seal and does not detract from the integrity of the draper canvas functionality.

SUMMARY OF THE INVENTION

The present invention therefore seeks to provide a draper seal that is composed of a flexible material in order to avoid binding of the draper canvas, while preventing fouling of implement components from undesirable material accumulation.

According to a first aspect of the present invention there is provided a draper seal for a harvesting header, where the header comprises a frame on which is mounted a forwardly disposed cutter bar assembly and a rearwardly disposed draper deck assembly. The draper deck assembly comprises two spaced-apart rollers on which a continuous loop of draper canvas is mounted, and a support plate disposed underneath an upper run of the draper canvas and between the rollers. The draper seal comprises a flexible strip that runs parallel to the cutter bar assembly and perpendicular to the direction of travel, the flexible strip having a forward edge and a rearward edge. A bracket secures the forward edge of the flexible strip to an upper surface of the cutter bar assembly, which bracket also extends rearwardly to bias the rearward edge of the flexible strip into engagement with an upper surface of the draper canvas, thereby creating a seal between the cutter bar assembly and the draper deck assembly.

According to a second aspect of the present invention, there is a provided a harvesting header comprising a frame, a forwardly disposed cutter bar assembly mounted on the frame, a rearwardly disposed draper deck assembly mounted on the frame, and a draper seal mounted on the cutter bar assembly. The draper deck assembly comprises two spaced-apart rollers on which a continuous loop of draper canvas is mounted, and a support plate disposed underneath an upper run of the draper canvas and between the rollers. The draper seal comprises a flexible strip that runs parallel to the cutter bar assembly and perpendicular to the direction of travel, the flexible strip having a forward edge and a rearward edge. A bracket secures the forward edge of the flexible strip to an upper surface of the cutter bar assembly, which bracket also extends rearwardly to bias the rearward edge of the flexible strip into engagement with an upper surface of the draper canvas, thereby creating a seal between the cutter bar assembly and the draper deck assembly.

In exemplary embodiments of the present invention, the flexible strip and the draper canvas are both composed of a fabric substrate that has been coated with rubber and then vulcanized. The bracket is preferably an elongate metal bracket that extends the length of the cutter bar assembly and secures the forward edge of the flexible strip with a plurality of bolts. The bracket preferably comprises a forward portion that is configured to engage and be secured to the cutter bar assembly, and a rearward portion that is angled downwardly to press the rearward edge of the flexible strip against the upper run of the draper canvas. The draper deck assembly may be comprised of a single draper canvas or two separate draper canvases moving cut crop material in a single direction, or paired draper canvasses each moving cut crop material toward a centrally disposed draper assembly that feeds the received crop material to a further processing unit such as a combine harvester.

A detailed description of an exemplary embodiment of the present invention is given in the following. It is to be understood, however, that the invention is not to be construed as being limited to this embodiment.

BRIEF DESCRIPTION OF THE DRAWINGS

In the accompanying drawings, which illustrate an exemplary embodiment of the present invention.

An exemplary embodiment of the present invention will now be described with reference to the accompanying drawings.

DETAILED DESCRIPTION OF EXEMPLARY EMBODIMENT

Only those parts of the header as are necessary for description of the draper seal are shown in the accompanying drawings and discussed herein, as the remaining parts and functions of the header are conventional and are well known to those skilled in the art.

Figure 1:
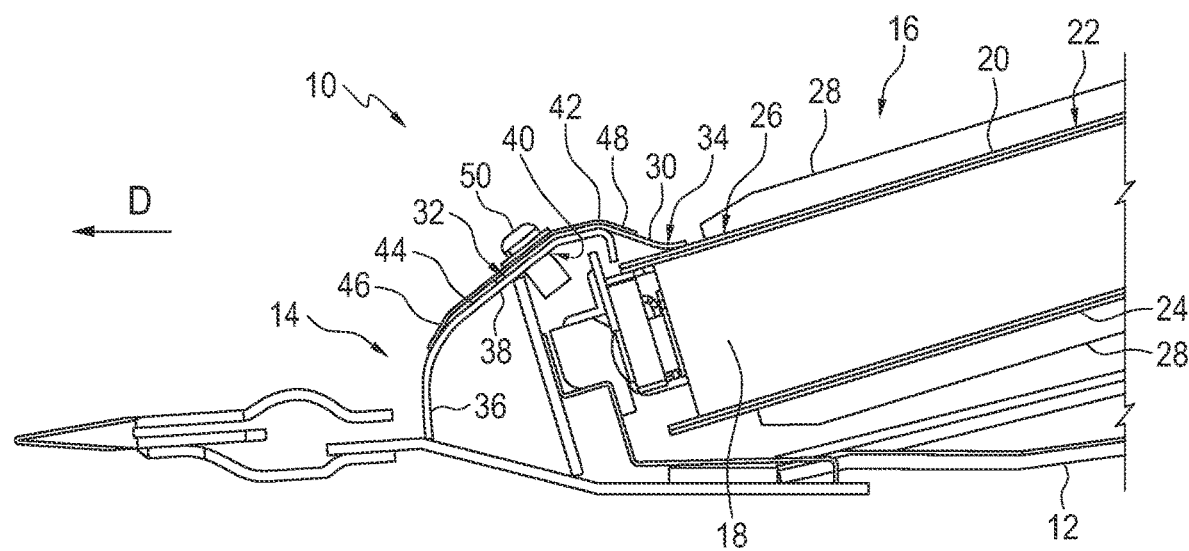
FIG. 1 is a simplified, partially cutaway elevation view of a draper seal according to the present invention.

Turning to FIG. 1, a header 10 according to the present invention is illustrated. The header comprises a frame 12 on which a cutter bar assembly 14 and a draper deck assembly 16 are mounted in a conventional manner.

The draper deck assembly 16 comprises a first roller 18 and a second roller (not shown) spaced apart from each other in a direction transverse to the direction of travel, which direction of travel is indicated by the letter D in FIG. 1. The rollers are mounted and powered in a conventional manner that will accordingly not be discussed further herein. The rollers provide support for a draper canvas 20, which is a continuous loop of material commonly formed by taking a fabric and coating it with rubber, which is then vulcanized and formed as desired for the particular application. The draper canvas 20, when installed on the rollers, has an upper run 22 passing above the rollers and a lower run 24 passing beneath the rollers, the upper run 22 presenting an upper surface 26 for receipt of cut crop materials during operation. An outer surface of the draper canvas 20 is provided with transverse slats 28 which run parallel to the direction of travel D and are commonly employed to aid in moving cut crop material along the draper deck assembly 16. The draper canvas 20 and slats 28 can best be seen in FIGS. 2 and 3. A support plate (not shown) is commonly provided between the rollers and immediately beneath the upper run 22 of the draper canvas 20 to provide support to the draper canvas 20. It is to be noted that the draper deck assembly 16 may be comprised of a single draper canvas 20 or two separate draper canvases moving cut crop material in a single direction, or paired draper canvasses each moving cut crop material toward a centrally disposed draper assembly that feeds the received crop material to a further processing unit such as a combine harvester; this will depend on the specific application and is not intended to limit the scope of the present invention.

The cutter bar assembly 14 comprises a beam 36, which beam 36 comprises an upper portion 38 that is disposed forward of and above the upper surface 26 of the draper canvas 20.

Figure 2:
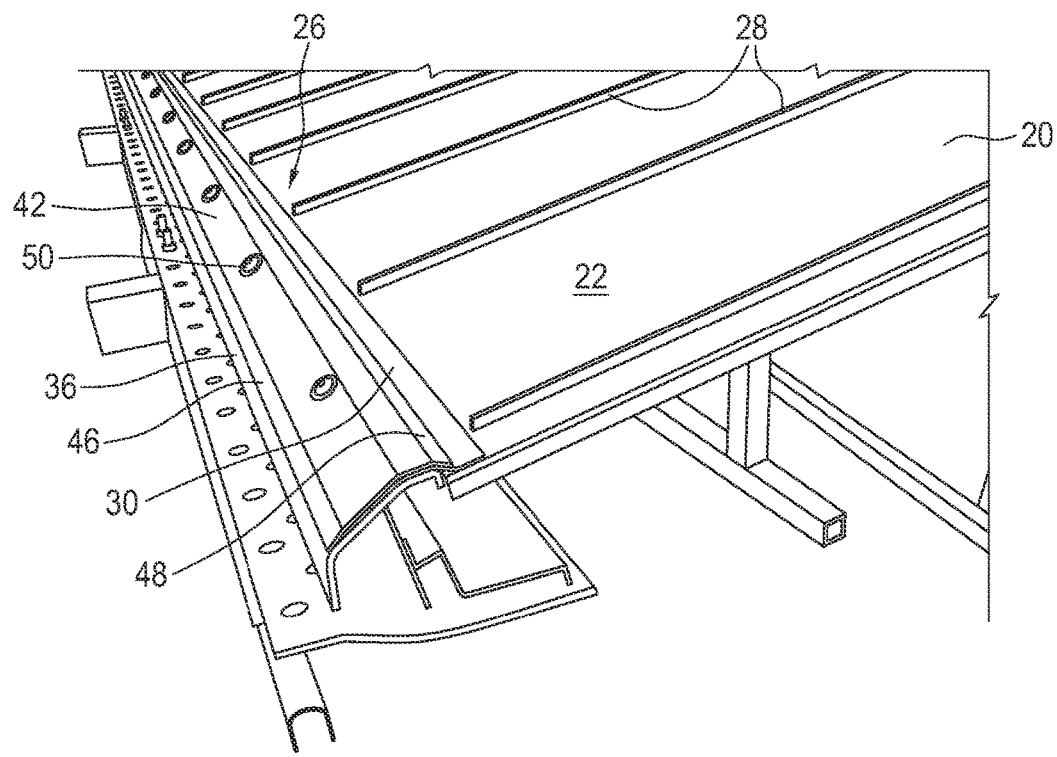
FIG. 2 is a perspective view of a partial cutter bar assembly and draper deck assembly with a draper seal according to the present invention.
Figure 3:
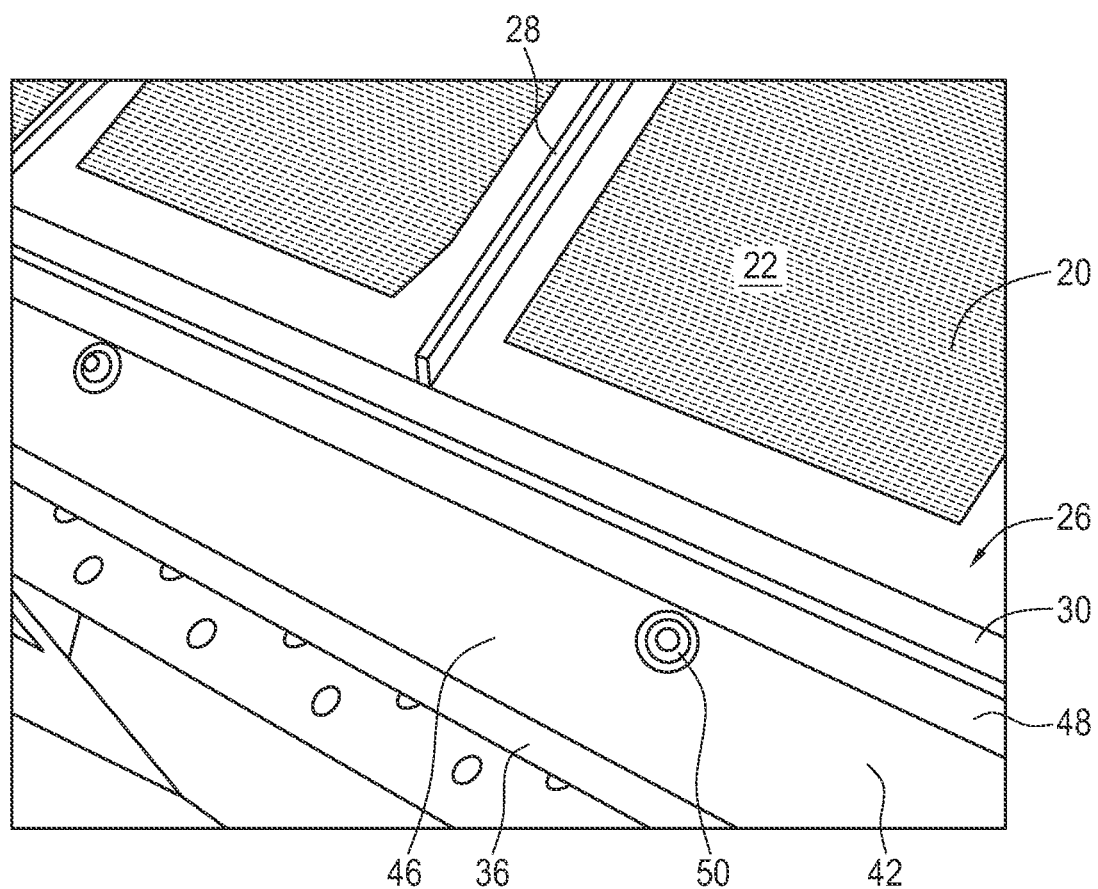
FIG. 3 is a perspective view of an adjacent cutter bar assembly and draper deck assembly with a draper seal according to the present invention.

Referring now to FIGS. 1 to 3, a draper seal according to the present invention comprises a bracket 42 and a flexible strip 30. The bracket 42 as illustrated is an elongate metal member that extends the length of the cutter bar assembly 14. The bracket 42 comprises a forward portion 46 and a rearward portion 48. The forward portion 46 of the bracket 42 is secured to an upper surface 44 of the upper portion 38 of the beam 36 by means of a series of bolts 50 that pass through aligned holes 40 in the bracket 42 and beam 36. As can best be seen in FIG. 1, the rearward portion 48 of the bracket 42 extends rearwardly of the upper portion 38 of the beam 36 and angles downwardly toward the draper canvas 20.

The flexible strip 30 runs the length of the bracket 42 and comprises a forward edge 32 and a rearward edge 34. The forward edge 32, as can best be seen in FIG. 1, is secured between the bracket 42 and the upper portion 38 of the beam 36 by means of the bolts 50. The rearward edge 34 extends rearwardly of the cutter bar assembly 14 and the bracket 42. The rearward portion 48 of the bracket 42 is angled downwardly toward the draper canvas 20, which has the effect of biasing the rearward edge 34 of the flexible strip 30 downwardly and into contact with the upper surface 26 of the draper canvas 20. The flexible strip 30 is preferably composed of a material similar to the draper canvas 20, namely a fabric that has been coated with rubber and vulcanized, which material has sufficient flexibility to contact the upper surface 26 of the draper canvas 20 without causing binding of the draper canvas 20 against the support plate.

The bracket 42 is shown as having a downwardly angled rearward portion 48, but it is also within the scope of the present invention to have a bracket that is in a single plane and is mounted to the cutter bar assembly in such a way that it rests in a plane that is angled toward the draper canvas 20 to bias the flexible strip 30 against the draper canvas 20.

As can be readily seen, then, there are numerous advantages provided by the present invention. The gap that would otherwise be present between the cutter bar assembly and the draper deck assembly is closed, thus avoiding accumulation of undesired materials. Also, the draper seal comprises a flexible strip that can press against the upper surface of the draper canvas in operation without causing binding and wear of the draper canvas, and it is not necessary to leave any forward part of the draper canvas unsupported. Finally, it is to be noted that the present invention provides a solution that involves a simple and rugged design appropriate to the anticipated operating conditions.

The foregoing is considered as illustrative only of the principles of the invention. Thus, while certain aspects and embodiments of the invention have been described, these have been presented by way of example only and are not intended to limit the scope of the invention. The scope of the claims should not be limited by the exemplary embodiments set forth in the foregoing, but should be given the broadest interpretation consistent with the specification as a whole.

The invention claimed is:

1. A harvesting header comprising:
a frame;

a forwardly disposed cutter bar assembly mounted on the frame and operable to cut crop to generate crop material;

a rearwardly disposed draper deck assembly mounted on the frame the draper deck assembly comprising two spaced-apart rollers on which a continuous loop of draper material is mounted, said draper canvas having an upper conveyor surface being operable to move in a direction of movement that is transverse to a direction of travel of the harvesting header, said upper conveyor surface operable to receive and move said cut crop in said direction of movement, and a draper seal apparatus comprising:

a continuous flexible strip oriented substantially parallel to the cutter bar assembly and substantially perpendicular to a direction of travel of the harvesting header, the flexible strip having a forward edge and a rearward edge; and a bracket mounted on the cutter bar assembly, the bracket configured to secure the forward edge of the flexible strip adjacent an upper surface of the cutter bar assembly;

wherein the bracket extends rearwardly and is operable such that said bracket biases the rearward edge of the flexible strip into substantially continuous engagement with an upper surface of the draper canvas during movement, in operation, of said draper canvas, to provide a seal at the rearward edge of the flexible strip and a leading edge region of the draper canvas between the cutter bar assembly and the draper deck assembly.

2. The harvesting header of claim 1 wherein the flexible strip and the draper canvas are both composed of a fabric substrate coated with vulcanized rubber.

3. The harvesting header of claim 1 wherein the bracket is an elongate metal bracket that extends the length of the cutter bar assembly.

4. The harvesting header of claim 1 wherein the bracket secures the forward edge of the flexible strip with a plurality of bolts.

5. The harvesting header of claim 1 wherein the bracket comprises a forward portion that is configured to engage and be secured to the cutter bar assembly, and a rearward portion that is angled downwardly to bias the rearward edge of the flexible strip into engagement with the upper surface of the draper canvas.

6. The harvesting header of claim 1 wherein the draper deck assembly comprises a single draper canvas or two separate draper canvases moving cut crop material in a single direction.

7. The harvesting header of claim 1 wherein the draper deck assembly comprises paired draper canvasses each moving cut crop material toward a centrally disposed draper assembly that feeds the received crop material to a further processing unit.

8. The harvesting header of claim 1 wherein the draper deck assembly further comprises a support plate disposed beneath an upper run of the draper canvas and between the rollers, the bracket biasing the rearward edge of the flexible strip such that the upper run of the draper canvas is loosely received between the rearward edge of the flexible strip and the support plate.

* * * * *